United States Patent Office 3,423,393
Patented Jan. 21, 1969

3,423,393
IRON COMPLEXES OF PYRAZOLONE MONOAZO DYES AND METHOD OF PREPARATION
Karl J. Klein, Albany, N.Y., assignor to GAF Corporation, a corporation of Delaware
No Drawing. Filed Mar. 17, 1965, Ser. No. 440,612
U.S. Cl. 260—147        12 Claims
Int. Cl. C09b 45/00

---

ABSTRACT OF THE DISCLOSURE

An iron complex of an azo dyestuff of the following formula:

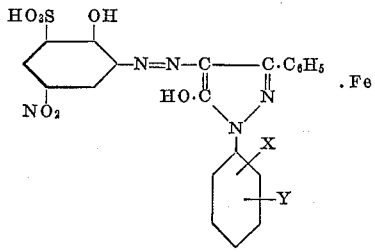

wherein X and Y may be various radicals substituted on the phenyl ring. The iron complex dyestuff is prepared by reacting a diazotized 2-hydroxy-5-nitrometanilic acid with a lower alkyl ester of benzoylacetic acid with subsequent reaction of the resultant intermediate with a phenyl hydrazine compound with the addition of a ferric salt in an amount sufficient to product a ratio of dye to iron of about 2:1. The iron complex dyestuffs of the present invention provide aesthetic olive-green dyes and are particularly suitable for dyeing leather.

---

This invention relates to a new azo dyestuff and to its method of manufacture. More specifically, this invention relates to a complex iron compound of an azo dyestuff of the following general formula:

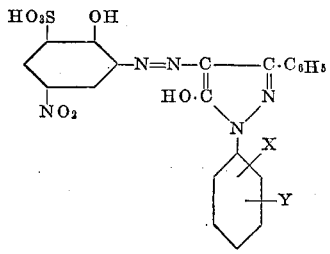

wherein X and Y may be the same or different and are members of the group consisting of hydrogen; halogen, such as bromine, chlorine, iodine and fluorine; lower alkyl, such as methyl, ethyl, isopropyl and propyl; lower alkylol, such as hydroxethyl and hydroxypropyl; cyano; sulfonamido; N-mono-substituted sulfonamido and N,N-di-substituted sulfonamido. Such N-mono- and N,N-di-substituted groups may be lower alkyl, such as methyl, ethyl, isopropyl, propyl and butyl; lower alkylol, such as hydroxyethyl and hydroxypropyl; lower alkyloxyloweralkyls, such as ethoxyethyl, methoxyethyl, ethoxypropyl; saturated heterocyclic hydrocarbons, such as morpholine and piperidine. The ratio of the dye to the iron is about 2:1.

The azo dyestuff of the present invention may be produced by diazotizing 2-hydroxy-5-nitrometanilic acid and thereafter coupling the diazo with 1,3-diphenyl-5-pyrazolone. Moreover, after coupling the diazo with the pyrazolone, the iron complex may then be produced. However, by coupling the diazo with the pyrazolone, the intermediary pyrazolone must be isolated, thereby requiring an added procedural step which suffers from the disadvantage of additional handling, time and expense.

In accordance with the process of the present invention, especially valuable results can be obtained when the coupling is carried out prior to the production of the pyrazolone coupler, thereby obviating the step of isolating the pyrazolone.

Moreover, it has been found that the dyes of the present invention possess unexpected and outstanding dyeing properties, particularly on leather.

Accordingly, one of the primary objects of this invention is to provide a dye having superior properties for dyeing leather.

A further object of this invention is to provide a novel process for producing the dyestuffs of the instant invention.

Another object of this invention is to provide a more simple and economical process for preparing the azo dyestuffs containing iron of the present invention, wherein the entire dye production is carried out in a continuous operation in one kettle.

The novel method for producing the azo dyestuffs of the present invention may be illustrated by the following schematic diagram:

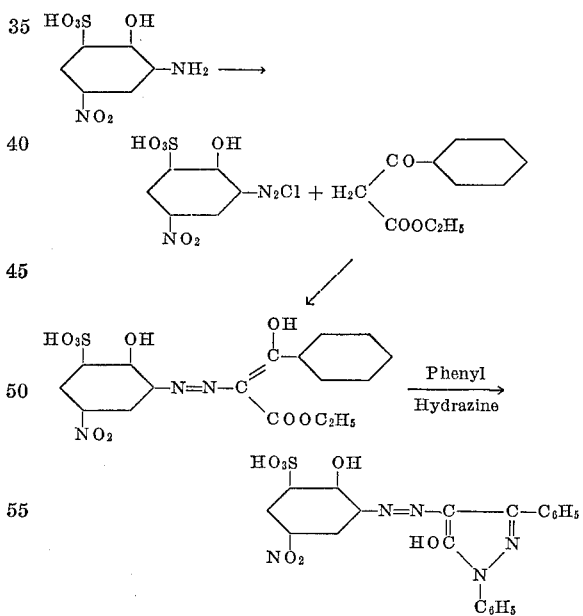

The process, as illustrated above, comprises diazotizing 2-hydroxy-5-nitrometanilic acid, reacting the diazotized 2-hydroxy-5-nitrometanilic acid with a lower alkyl ester of benzoylacetic acid, and thereafter reacting the resultant intermediate with a phenyl hydrazine compound of the following general formula:

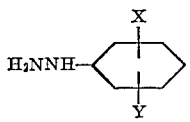

wherein X and Y are the same as defined above in the general formula, separating the thus formed dye product, adding a ferric salt in an amount sufficient to produce a ratio of about two dye molecules to one metal atom. This dye is then converted into the iron complex.

In carrying out the process, the 2-hydroxyl-5-nitrometanilic acid is diazotized with nitrous acid in an acidic medium. Usually hydrochloric acid is used as the acidic medium with sodium nitrite as the nitrous acid source, and the temperature maintained under 25° C. The diazo is then added to an alkaline solution of an approximately equimolar amount of a lower alkyl ester of benzoylacetic acid at a temperature below about 15° C. Illustrative of the lower alkyl esters are the methyl, ethyl or propyl esters. An excess up to about 10% of either reactant may be present if desired.

The charge is adjusted to a pH of about 4 to 5 and it is warmed to 90° to 100° C. An approximately equivalent amount to an excess of about 10% of a phenylhydrazine of the formula:

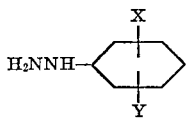

wherein X and Y have the same significance as above is added and the temperature maintained from 90° C. to the boiling point until reaction is complete, usually 2 to 10 hours. After being allowed to cool, it is salted out and filtered.

The presscake is slurried with water to which is then added a water-soluble iron salt, such as ferric chloride, ferric sulfate and ferric nitrate. The amount of ferric salt added is that amount needed to produce a ratio of about two dye molecules to one metal atom.

The pH is adjusted to faint alkalinity and the charge heated to the boil for several hours. It is allowed to cool, salted and filtered. The dyestuff is obtained in excellent yield.

More specifically, the dyes of the general formula have the particular uniqueness of being able to dye leather in unusual shades. For example, when X and Y, in the general formula, are hydrogen, the dye has a very pleasing tan shade on chrome tanned leather, and a most difficult to obtain olive color on sumac tanned leather. Moreover, the dyes of the present invention are soluble in water, dye leather in level shades, have excellent penetration and good light fastness. In adition, the novel dyes of this invention blend well with other dyes.

The invention is illustrated by the following examples, without, however, being limited thereto:

Example 1

To 220 grams of water was added 34 grams of 2-hydroxy-5-nitrometanilic acid. After stirring to a smooth slurry, 3.6 grams of hydrochloric acid (20° Bé.) was added. At about 20° C., 10 grams of sodium nitrite (31.5% solution) was added. After stirring about 1 hour, excess nitrite is removed by treatment with sulfamic acid.

In the meantime, 30.4 grams of ethyl benzoyl acetate and 50 grams of soda ash were dissolved in 600 cc. of water and iced to 12° to 15° C. The diazo solution was slowly run into this solution and stirred for several hours. The pH was then adjusted to about 4 by addition of 15 grams of hydrochloric acid and 50 grams of glacial acetic acid. The temperature was raised to 95° C. and 12 grams of phenyl hydrazine was added. The temperature was held at the boil for about 4 hours, allowed to cool, salted out and filtered.

The presscake was dissolved in 450 grams of water to which was added 12.6 grams of ferric chloride. It was stirred for 1 hour, followed by addition of caustic soda to a pH of about 7.5. It was heated at the boil for 2 hours, allowed to cool, salted out and filtered. The dyestuff was obtained in good yield and in good crystalline form.

A dyeing made on chrome tanned leather had an excellent level tan and, on sumac treated leather, a unique level olive shade with good penetration.

The azo dyestuff prepared in accordance with this example may be represented by the following formula:

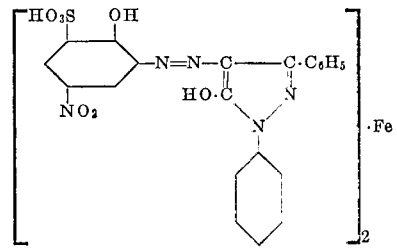

Example 2

Example 1 was repeated with the exception that the phenyl hydrazine was replaced by 20 grams of m-hydrazinobenzenesulfonamide. A dye was obtained which dyes leather in excellent level shades having good penetration and build-up.

Example 3

Example 1 was repeated with the exception that the phenyl hydrazine was replaced by 19 grams of 2,5-dichlorophenyl hydrazine. A dye was obtained which dyes leather in excellent level shades having good penetration and build-up.

Example 4

Example 1 was repeated with the exception that the phenyl hydrazine was replaced by 13 grams of p-tolyl hydrazine to yield a dye which dyes leather in excellent level shades having good penetration and build-up.

Example 5

Example 1 was repeated with the exception that the phenyl hydrazine was replaced by 14.5 grams of o-anisyl hydrazine to yield a dye which dyes leather in excellent level shades having good penetration and build-up.

What is claimed is:

1. An iron complex of an azo dyestuff of the following formula:

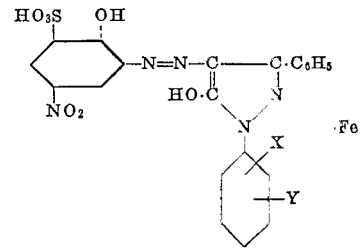

wherein X and Y are members selected from the group consisting of hydrogen, halogen, lower alkyl, lower alkyloxy, cyano, sulfonamido, N-mono-substituted sulfonamido and N,N-di-substituted sulfonamido, said substitution being selected from lower alkyl, lower alkylol, lower alkyloxyloweralkyl, morpholine and piperidine, wherein the ratio of dye to iron is about 2:1.

2. An iron complex of a dye of the following formula:

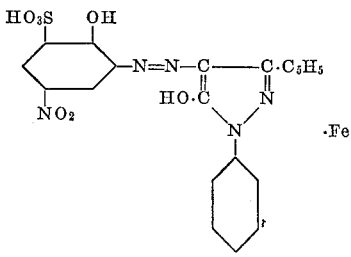

wherein the ratio of dye to iron is about 2:1.

3. An iron complex of a dye of the following formula:

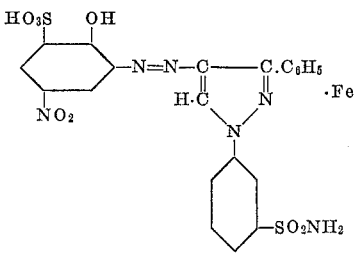

wherein the ratio of dye to iron is about 2:1.

4. An iron complex of a dye of the following formula:

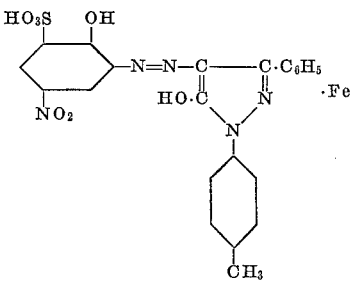

wherein the ratio of dye to iron is about 2:1.

5. An iron complex of a dye of the following formula:

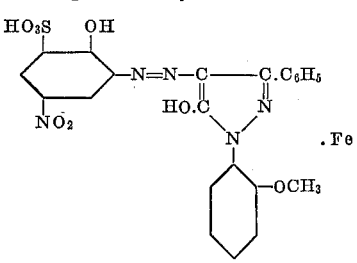

wherein the ratio of dye to iron is about 2:1.

6. An iron complex of a dye of the following formula:

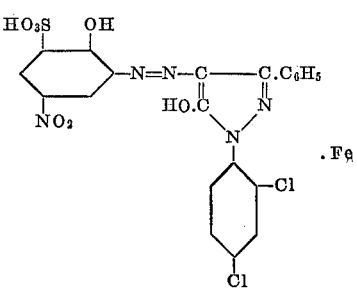

wherein the ratio of dye to iron is about 2:1.

7. A process for producing a dyestuff of the following formula:

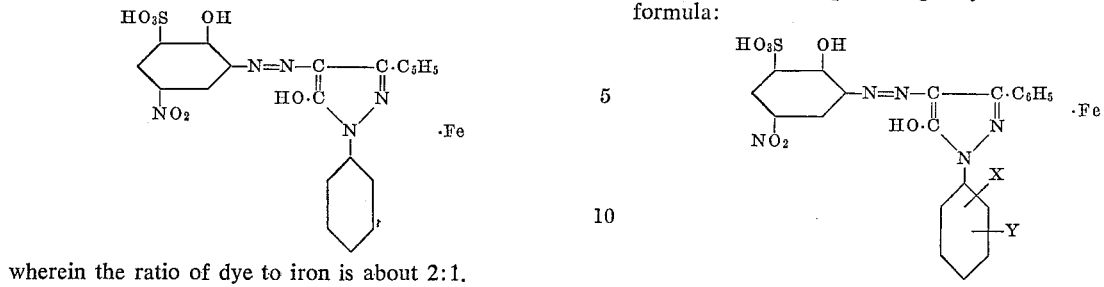

wherein X and Y are members selected from the group consisting of hydrogen, halogn, lower alkyl, lower alkyloxy, cyano, sulfonamido, N-mono-substituted sulfonamido, and N,N-di-substituted sulfonamido, said substitution being selected from lower alkyl, lower alkylol, lower alkyloxyloweralkyl, morpholine and piperidine, which comprises diazotizing 2-hydroxy-5-nitrometanilic acid, reacting the resultant diazotized 2-hydroxy-5-nitrometanilic acid with a lower alkyl ester of benzoylacetic acid at a temperature below about 15° C., reacting the resultant intermediate with a phenyl hydrazine compound of the following general formula:

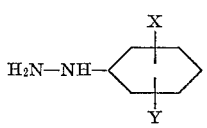

maintaining the temperature at a temperature of between about 90° C. and the boiling point of the system until reaction is complete, separating the thus formed dye product, adding a ferric salt in an amount sufficient to produce a ratio of dye to iron of about 2:1.

8. A process according to claim 7, wherein said hydrazine compound is m-hydrazinobenzenesulfonamide.

9. A process according to claim 7, wherein said hydrazine compound is phenyl hydrazine.

10. A process according to claim 7, wherein said hydrazine compound is 2,5-dichlorophenyl hydrazine.

11. A process according to claim 7, wherein said hydrazine compound is p-tolyl hydrazine.

12. A process according to claim 7, wherein said hydrazine compound is o-anisyl hydrazine.

References Cited

UNITED STATES PATENTS

| | | | |
|---|---|---|---|
| 1,844,397 | 2/1932 | Kammerer et al. | 260—147 |
| 1,841,623 | 1/1932 | Mendoza | 260—163 |
| 1,856,413 | 5/1932 | Geller | 260—163 |
| 2,015,429 | 9/1935 | Kracker et al. | 260—163 XR |
| 2,040,368 | 5/1936 | Fischer | 260—147 |
| 2,120,799 | 6/1938 | Crossley et al. | 260—147 |
| 2,421,315 | 5/1947 | Carson | 260—147 |
| 2,543,691 | 2/1951 | Friedman. | |
| 2,734,895 | 2/1956 | Zickendraht et al. | 260—193 XR |

FOREIGN PATENTS

| | | |
|---|---|---|
| 552,614 | 2/1958 | Canada. |
| 642,408 | 6/1962 | Canada. |

FLOYD D. HIGEL, *Primary Examiner.*

U.S. Cl. X.R.

8—13, 42; 260—163, 193, 247, 247.1, 247.7, 293, 465, 556, 569